US010160494B2

(12) United States Patent
Yamada

(10) Patent No.: US 10,160,494 B2
(45) Date of Patent: Dec. 25, 2018

(54) VEHICLE BODY FRONT SECTION STRUCTURE

(71) Applicant: TOYOTA JIDOSHA KABUSHIKI KAISHA, Toyota-shi (JP)

(72) Inventor: Kenjiro Yamada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/376,378

(22) Filed: Dec. 12, 2016

(65) Prior Publication Data

US 2017/0088183 A1 Mar. 30, 2017

Related U.S. Application Data

(62) Division of application No. 14/781,828, filed as application No. PCT/JP2013/060395 on Apr. 4, 2013, now Pat. No. 9,676,417.

(51) Int. Cl.
*B62D 21/15* (2006.01)
*B60R 19/24* (2006.01)
(Continued)

(52) U.S. Cl.
CPC ............ *B62D 21/152* (2013.01); *B60R 19/12* (2013.01); *B60R 19/24* (2013.01); *B60R 19/34* (2013.01);
(Continued)

(58) Field of Classification Search
CPC ......... B60R 19/24; B60R 19/26; B60R 19/34; B62D 21/15; B62D 21/152; B62D 25/08; B62D 25/082; B62D 25/085
(Continued)

(56) References Cited

U.S. PATENT DOCUMENTS 8,056,926 B2 11/2011 Okabe
8,496,287 B2 7/2013 Matsuura
(Continued)

FOREIGN PATENT DOCUMENTS

CN 101734287 6/2010
CN 102137787 7/2011
(Continued)

OTHER PUBLICATIONS

Office Action issued in Chinese Patent Application No. 201380075172.9 dated Aug. 18, 2016.
(Continued)

*Primary Examiner* — Jason S Daniels
(74) *Attorney, Agent, or Firm* — Oblon, McClelland, Maier & Neustadt, L.L.P.

(57) ABSTRACT

A vehicle body front section structure includes a front side member, an outer side frame member, a linking member, and a reinforcing structure. The outer side frame member is disposed separated from the front side member at a vehicle width direction outer side, has a vehicle front-rear direction rear end connected to an apron section or to a front pillar, and has a vehicle front-rear direction front end side overlapping with a vehicle front-rear direction front end side of the front side member in side view. The linking member links the vehicle front-rear direction front end side of the front side member and the vehicle front-rear direction front end side of the outer side frame member, and is input with a collision load. The reinforcing structure reinforces the outer side frame member at a portion of the outer side frame member overlapping with the front side member in side view.

4 Claims, 7 Drawing Sheets

(51) Int. Cl.
*B60R 19/34* (2006.01)
*B60R 19/12* (2006.01)
*B62D 25/08* (2006.01)
*B60R 21/00* (2006.01)
*B60K 11/04* (2006.01)
*B60R 19/18* (2006.01)

(52) U.S. Cl.
CPC ......... *B62D 21/155* (2013.01); *B62D 25/082* (2013.01); *B62D 25/085* (2013.01); *B60K 11/04* (2013.01); *B60R 2019/182* (2013.01); *B60R 2021/0023* (2013.01); *B60R 2021/0025* (2013.01)

(58) Field of Classification Search
USPC .................. 293/132, 133; 296/187.09, 187.1, 296/193.09, 203.02
See application file for complete search history.

(56) References Cited

U.S. PATENT DOCUMENTS

| | | |
|---|---|---|
| 8,764,104 B2 | 7/2014 | Kihara |
| 2007/0176443 A1 | 8/2007 | Yasuhara et al. |
| 2010/0127531 A1 | 5/2010 | Yasuhara et al. |
| 2011/0148151 A1 | 6/2011 | Abe et al. |
| 2012/0031160 A1 | 2/2012 | Sanjay |
| 2013/0207417 A1 | 8/2013 | Kihara et al. |
| 2015/0232050 A1 | 8/2015 | Yamada |

FOREIGN PATENT DOCUMENTS

| | | |
|---|---|---|
| JP | 10-81259 | 3/1998 |
| JP | 2005-231435 | 9/2005 |
| JP | 2007-190964 | 8/2007 |
| JP | 2010-83455 | 4/2010 |
| JP | 2010-125884 | 6/2010 |
| JP | 2012-35704 | 2/2012 |
| JP | 2012-81844 A | 4/2012 |
| WO | WO 2012/035946 A1 | 3/2012 |

OTHER PUBLICATIONS

International Search Report Issued in PCT/JP13/060395 dated Jul. 2, 2013.

Japanese Office Action issued in Patent Application No. 2015-509822 dated May 31, 2016.

Notice of Allowance dated Feb. 22, 2017 in co-pending U.S. Appl. No. 14/781,828.

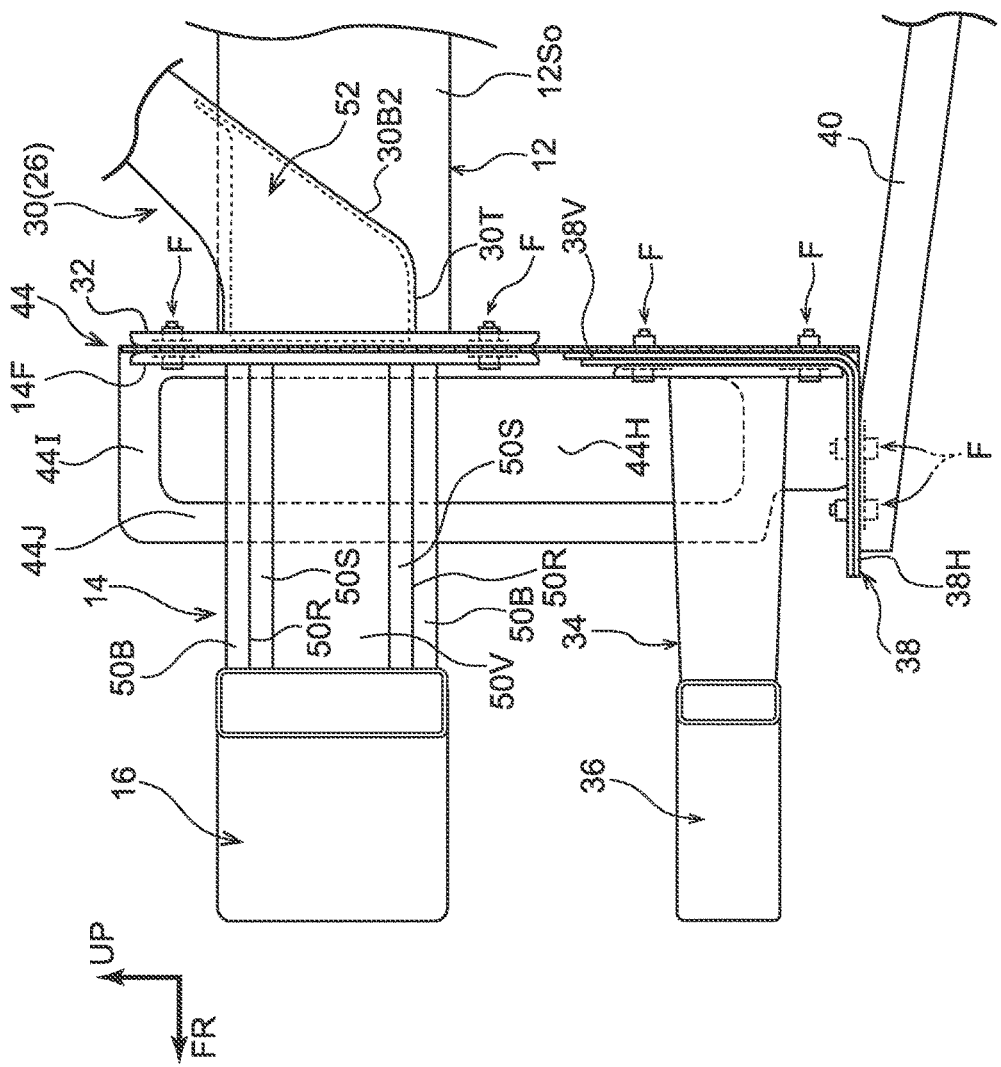

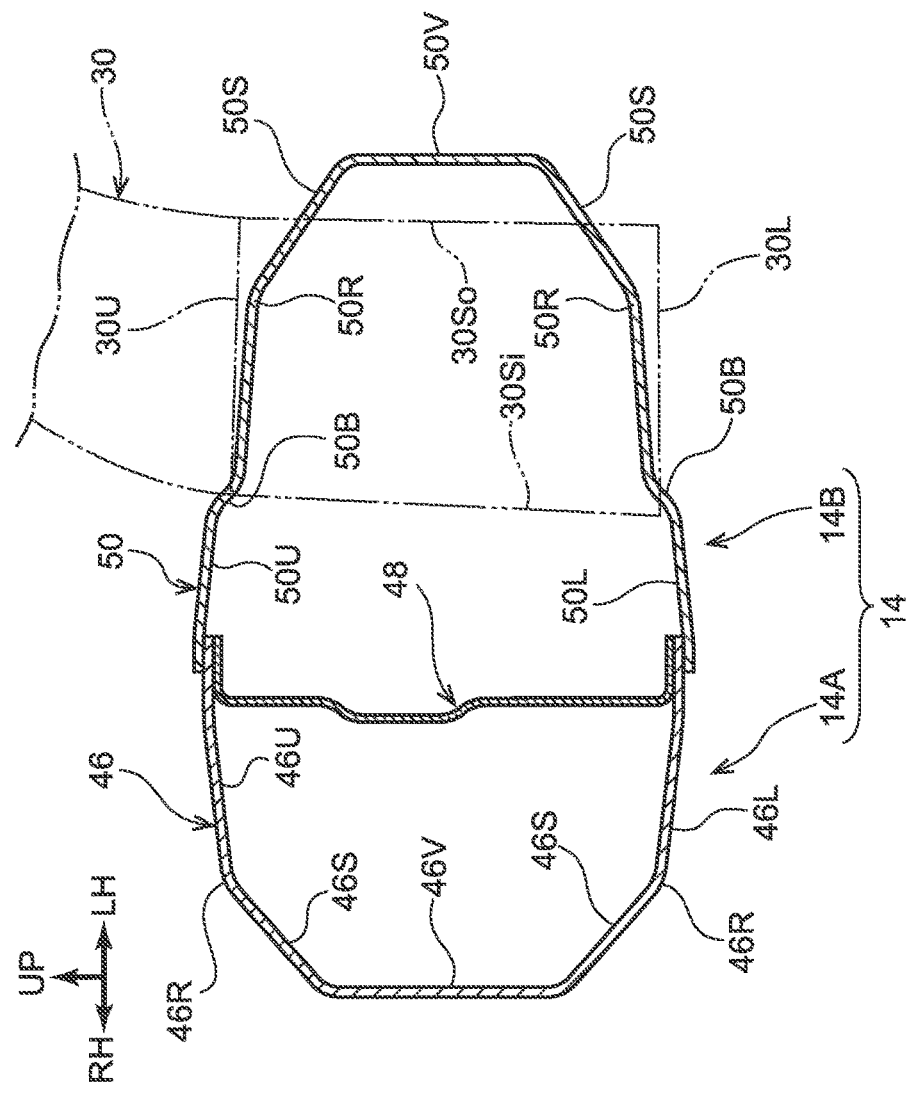

VEHICLE BODY FRONT SECTION STRUCTURE

CROSS-REFERENCE TO RELATED APPLICATIONS

This application is a division of U.S. application Ser. No. 14/781,828 filed Oct. 1, 2015, the entire contents of which is incorporated herein by reference. U.S. application Ser. No. 14/781,828 is a 371 of International Application No. PCT/JP13/060395 filed Apr. 4, 2013.

TECHNICAL FIELD

The present invention relates to a vehicle body front section structure.

BACKGROUND ART

Structures are known in which a coupling member is attached to a front end portion of apron reinforcement, and a face portion attached to a front end of the coupling member is fastened together between a front side frame and a crash can (see, for example, Japanese Patent Application Laid-Open (JP-A) No. 2005-231435).

SUMMARY OF INVENTION

Technical Problem

However, there is room for improvement from the standpoint of further suppressing deformation of a vehicle body under load input to a vehicle width direction end portion of the vehicle in the event of a small overlap collision, an oblique collision, or the like.

An object of the present invention is to obtain a vehicle body front section structure capable of efficiently moving a vehicle body toward a collision opposite side in the event of a small overlap collision or an oblique collision.

Solution to Problem

A vehicle body front section structure according to a first aspect of the present invention includes: a front side member; an outer side frame member that is disposed separated from the front side member at a vehicle width direction outer side, that has a vehicle front-rear direction rear end connected to an apron section or to a front pillar, and that has a vehicle front-rear direction front end side overlapping with a vehicle front-rear direction front end side of the front side member in side view; a linking member that links the vehicle front-rear direction front end side of the front side member and the vehicle front-rear direction front end side of the outer side frame member, and that is input with a collision load; and a reinforcing structure that reinforces the outer side frame member at a portion of the outer side frame member overlapping with the front side member in side view.

In the above aspect, collision load acts on the front side member and the outer side frame member through the linking member. When the collision mode is a small overlap collision, an oblique collision, or the like, the front end side of the outer side frame member, namely, a portion overlapping with the front side member in side view, is pushed inward in the vehicle width direction, and pushes the front side member from the vehicle width direction outer side. The reinforcing structure is provided to the portion of the outer side frame member overlapping with the front side member in side view, such that load from a colliding body is efficiently transmitted to the vehicle body structure through the front side member. This enables load from the colliding body to be efficiently converted into lateral force pushing the vehicle body toward the collision opposite side, and enables the vehicle body to be efficiently moved toward the collision opposite side during a small overlap collision or an oblique collision.

The vehicle body front section structure according to the above aspect accordingly enables the vehicle body to be efficiently moved toward the collision opposite side during a small overlap collision or an oblique collision.

The above aspect may be configured such that a cross-section of the outer side frame member orthogonal to a length direction thereof configures a closed cross-section; and the reinforcing structure configures a closed cross-section structure provided inside the closed cross-section.

In the above aspect, the reinforcing structure is a closed cross-section structure, thereby enabling load from the colliding body to be efficiently converted into lateral force and transmitted to the front side member using a simple and lightweight structure.

The above aspect may be configured such that the reinforcing structure is formed as a closed cross-section structure by joining together a base end portion and a terminal end portion of a bent plate member, with a wall portion including the base end portion or the terminal end portion configuring a lateral wall portion spanning the an entire width in a vehicle width direction.

In the above aspect, the wall portion including the base end portion or the terminal end portion of the reinforcing structure formed with a closed cross-section structure by a wrapped-around structure configures the lateral wall portion spanning the entire width in the vehicle width direction. This enables load to be efficiently transmitted to the front side member through the lateral wall portion, even in a situation in which the join between the base end portion and the terminal end portion comes apart.

The above aspect may be configured such that a cross-section of the linking member orthogonal to the vehicle front-rear direction configures a closed cross-section, and the linking member is configured including a shock absorbing member interposed between a bumper reinforcement and front ends of the front side member and the outer side frame member; and a step portion is formed at an upper wall or a lower wall of the shock absorbing member overlapping with a vehicle width direction inner side wall portion of the outer side frame member in front view.

In the above aspect, energy is absorbed by the shock absorbing member during an initial stage of the collision. The shock absorbing member is widened so as to link between the respective front ends of the front side member and the outer side frame member, such that the bumper reinforcement is suppressed from folding at an end portion, and energy is efficiently absorbed. The stepped portion is formed at the portion of the shock absorbing member overlapping with the inner side wall of the outer side frame member, such that energy is more efficiently absorbed than in a configuration in which the stepped portion is not formed.

A vehicle body front section structure according to a second aspect of the present invention includes: a front side member; an outer side frame member that is disposed separated from the front side member at a vehicle width direction outer side; and a shock absorbing member that is widened so as to straddle between the front side member and the outer side frame member, that has a cross-section orthogonal to a vehicle front-rear direction configuring a closed cross-section, that is interposed between bumper reinforcement and respective vehicle front-rear direction front ends of the front side member and the outer side frame member, that includes a step portion formed at an upper wall or a lower wall overlapping with an inner side wall that is a vehicle width direction inner side wall portion of the outer side frame member in front view, and that deforms or fails under load from the vehicle front.

In the above aspect, energy is absorbed by the shock absorbing member during the initial stage of the collision in a small overlap collision or an oblique collision in which load is input to a vehicle width direction end portion of the bumper reinforcement. The shock absorbing member is widened so as to link between the respective front ends of the front side member and the outer side frame member, such that the bumper reinforcement is suppressed from folding at the end portion, and the energy is efficiently absorbed. The stepped portion is formed at the portion of the shock absorbing member overlapping with the inner side wall of the outer side frame member, such that energy is more efficiently absorbed than in a configuration in which the stepped portion is not formed.

The above aspect may be configured such that the outer side frame member is configured lengthwise along the vehicle front-rear direction in plan view, and has a vehicle front-rear direction rear end connected to an apron section or a front pillar.

In the above aspect, collision load from the bumper reinforcement and the shock absorbing member can be distributed over a wider range of the vehicle body than in a configuration in which the outer side frame member is a widened portion, a branched portion, or the like of the front side member.

Advantageous Effects of Invention

The present invention exhibits an excellent advantageous effect of enabling a vehicle body to be efficiently moved toward a collision opposite side during a small overlap collision or an oblique collision.

BRIEF DESCRIPTION OF DRAWINGS

FIG. 4 is an enlarged side view illustrating relevant portions of a vehicle body front section structure according to an exemplary embodiment of the present invention.

FIG. 5 is a cross-section illustrating a cross-section profile orthogonal to a compression direction of a crash box configuring a vehicle body front section structure according to an exemplary embodiment of the present invention.

DESCRIPTION OF EMBODIMENTS

Explanation follows regarding a vehicle body front section structure 10 serving as a vehicle body end section structure according to an exemplary embodiment of the present invention, based on FIG. 1 to FIG. 7. Note that in each of the drawings, the arrow FR indicates the front direction in the vehicle front-rear direction, the arrow UP indicates the upper direction in the vehicle up-down direction, the arrow RH indicates the right direction (one vehicle width direction) side when facing the front direction, and the arrow LH indicates the left direction (the other vehicle width direction) side when facing the front direction, as appropriate. In the explanation below, unless specifically stated otherwise, reference to the front-rear, up-down, and left-right directions refer to front-rear in the vehicle front-rear direction, up-down in the vehicle up-down direction, and left-right when facing the front direction. In the exemplary embodiment below, unless specifically stated otherwise, "join" refers to joining by spot welding; however, it does not exclude the use of other joins, such as arc welding or fastening, instead of spot welding.

Basic Configuration of Vehicle Body Front Section

Figure 2:
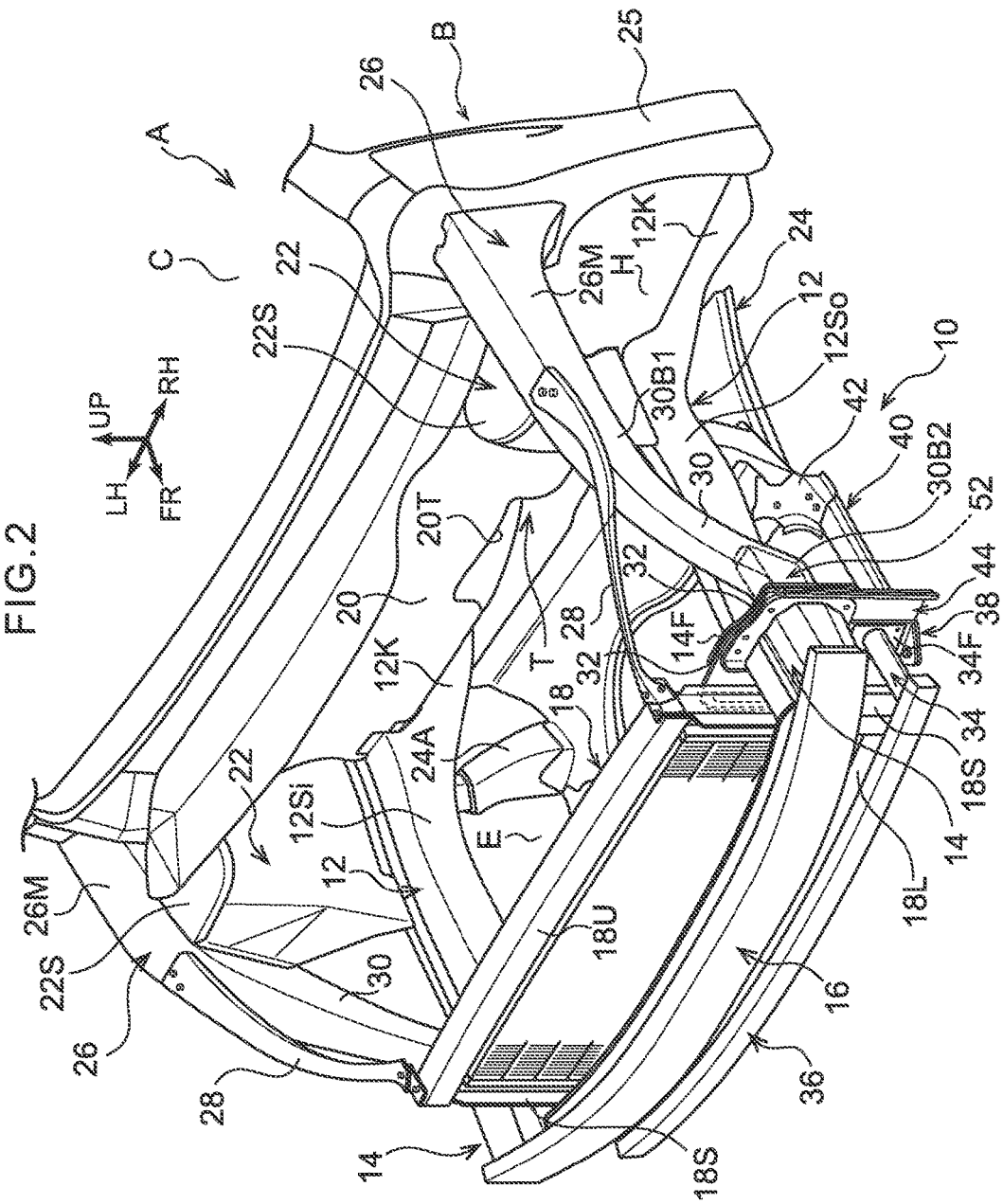
FIG. 2 is a perspective view illustrating an overall outline configuration of a vehicle body front section structure according to an exemplary embodiment of the present invention.

FIG. 2 is a perspective view of a schematic configuration of a front section of an automobile A applied with the vehicle body front section structure. As illustrated in FIG. 2, a vehicle body B of the automobile A includes a pair of left and right front side members 12, serving as a first support section. The front side members 12 each are configured lengthwise along the front-rear direction and are disposed side-by-side in the vehicle width direction. Each front side member 12 is joined by fastening to bumper reinforcement 16 that is configured lengthwise along the vehicle width direction through a crash box 14. Namely, the bumper reinforcement 16 spans between front ends of the left and right crash boxes 14.

A radiator support 18 that supports a radiator unit R serving as a vehicle installation structure is disposed between front portions of the left and right front side members 12. In the present exemplary embodiment, the radiator unit R configures a unit (assembly) in which a radiator and an air conditioning condenser are linked together so as to be capable of being handled as a single unit. The radiator support 18 is configured including a section forming a rectangular frame shape in front view, since both vehicle width direction ends of an upper member 18U and a lower member 18L that face each other at the top and bottom are joined by a pair of left and right radiator support side 18S. The radiator support 18 is linked to each of the front side members 12 by a coupling plate 44, described later.

A rear end side of each front side member 12 is joined to a dash panel 20 that partitions between an engine compartment E and a cabin C. More specifically, a rear portion of the front side member 12 configures a kick portion 12K that is sloped such that the rear side is positioned lower than the front side, and the kick portion 12K is joined to a front face side of the dash panel 20. A lower rear end of the kick portion 12K is linked to floor under-reinforcement that is joined to the lower side of a floor panel, not illustrated in the drawings. A tunnel portion 20T linking to a floor tunnel T is formed at a vehicle width direction center portion of the dash panel 20.

A fender apron 22 is provided at the vehicle width direction outer side of each front side member 12. In the present exemplary embodiment, each fender apron 22 forms a wheelhouse H that houses a front wheel, not illustrated in the drawings, so as to be capable of being steered, and that is integrally formed with a suspension tower 22S. Each suspension tower 22S is configured to support an upper end portion of a suspension, not illustrated in the drawings, supporting the front wheel housed inside the wheelhouse H. A suspension member 24 for supporting the suspension is attached to each front side member 12. In the present exemplary embodiment, the suspension member 24 configures an I-shaped suspension member that is configured lengthwise along the vehicle width direction, and with lower arms, not illustrated in the drawings, configuring the suspension at both vehicle width direction ends, supported so as to be rotatable about an axis along the front-rear direction.

The suspension member 24 is joined to the front side members 12 at plural separate front and rear locations. Specifically, front portions at both vehicle width direction outer ends of the suspension member 24 are joined from below to front-rear direction intermediate portions of the front side members 12 through arm members 24A. Although not illustrated in the drawings, rear portions at both vehicle width direction outer ends of the suspension member 24 are directly or indirectly joined to lower rear end portions of the kick portions 12K of the front side members 12.

A vehicle width direction inner end and lower end portion of each fender apron 22 is joined to the front side member 12. An apron upper member 26, this being a frame section that is configured lengthwise along the front-rear direction, is joined to a vehicle width direction outer end and upper end portion of the fender apron 22. Each apron upper member 26 is disposed running along a vehicle width direction outer end at a front upper section of the vehicle body B, and has a rear end portion joined to a front pillar 25. Note that the apron upper member 26 may be configured joined to the front pillar 25 through a cowl section. In the present exemplary embodiment, a structure formed by joining the fender apron 22 and the apron upper member 26 together, or a single one of these configuration members, corresponds to an apron section of the present invention.

Each apron upper member 26 is coupled to an upper end of the radiator support side 18S (a vehicle width direction outer end portion of the upper member 18U) configuring the radiator support 18 through an inner extension 28 configured as a separate member.

In the configuration explained above, a power unit P (see FIG. 7), this being a drive source of the automobile A, is disposed inside the engine compartment E. The power unit P is directly or indirectly supported between the left and right front side members 12 and at the rear of the radiator unit R by configuration regions of the vehicle body B, such as the left and right front side members 12 and the suspension member 24.

Configuration of Relevant Portions

Relevant portions of the vehicle body front section structure 10 are basically configured with left-right symmetry, and so explanation is mainly regarding the structure of one vehicle width direction side (the left side) in the below explanation. Thus in the below explanation, mainly, the left side indicated by the arrow LH is the vehicle width direction outer side, and the right side indicated by the arrow RH is the vehicle width direction inner side.

Apron Extension Section

Figure 1:
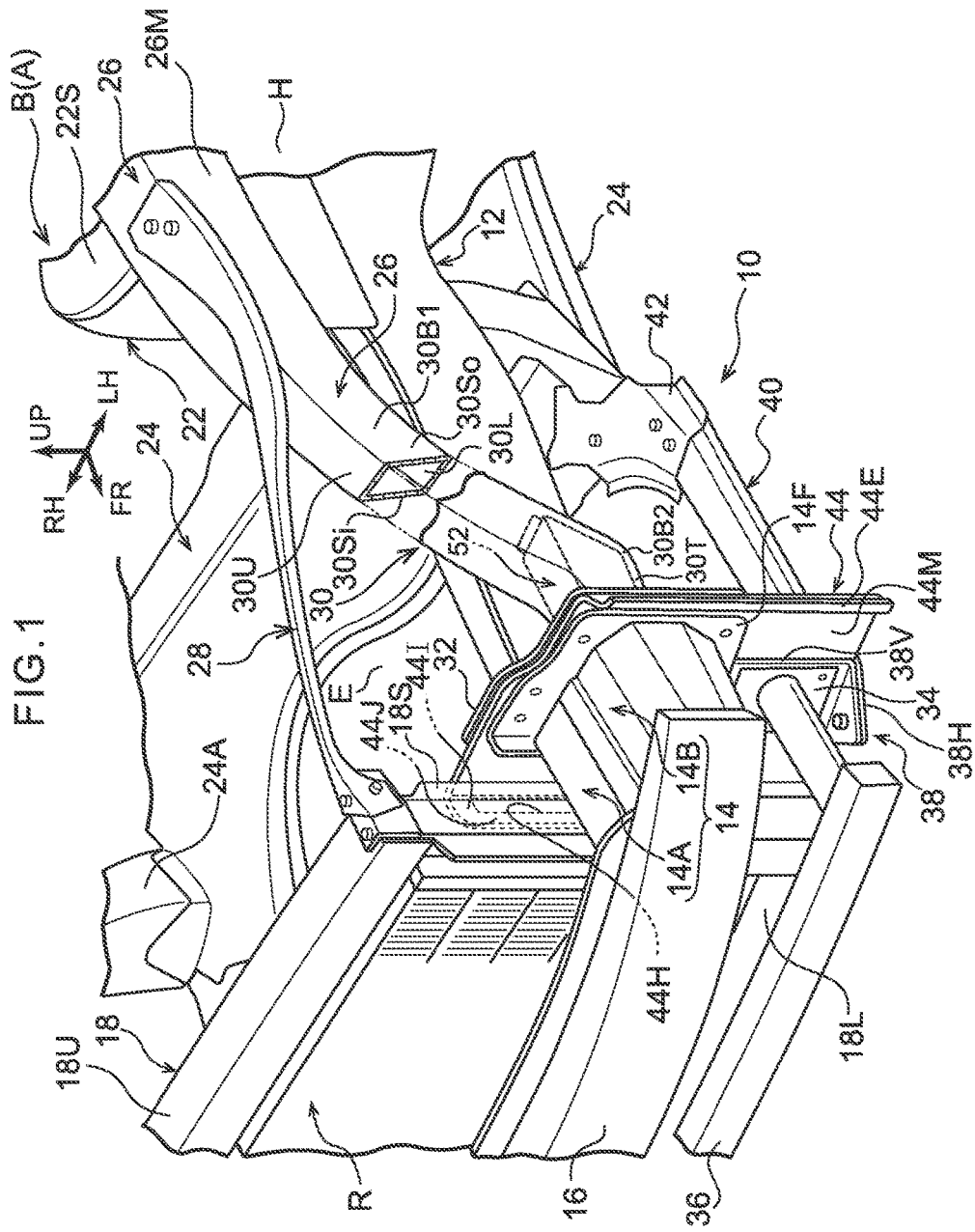
FIG. 1 is an enlarged perspective view illustrating relevant portions of a vehicle body front section structure according to an exemplary embodiment of the present invention.
Figure 3:
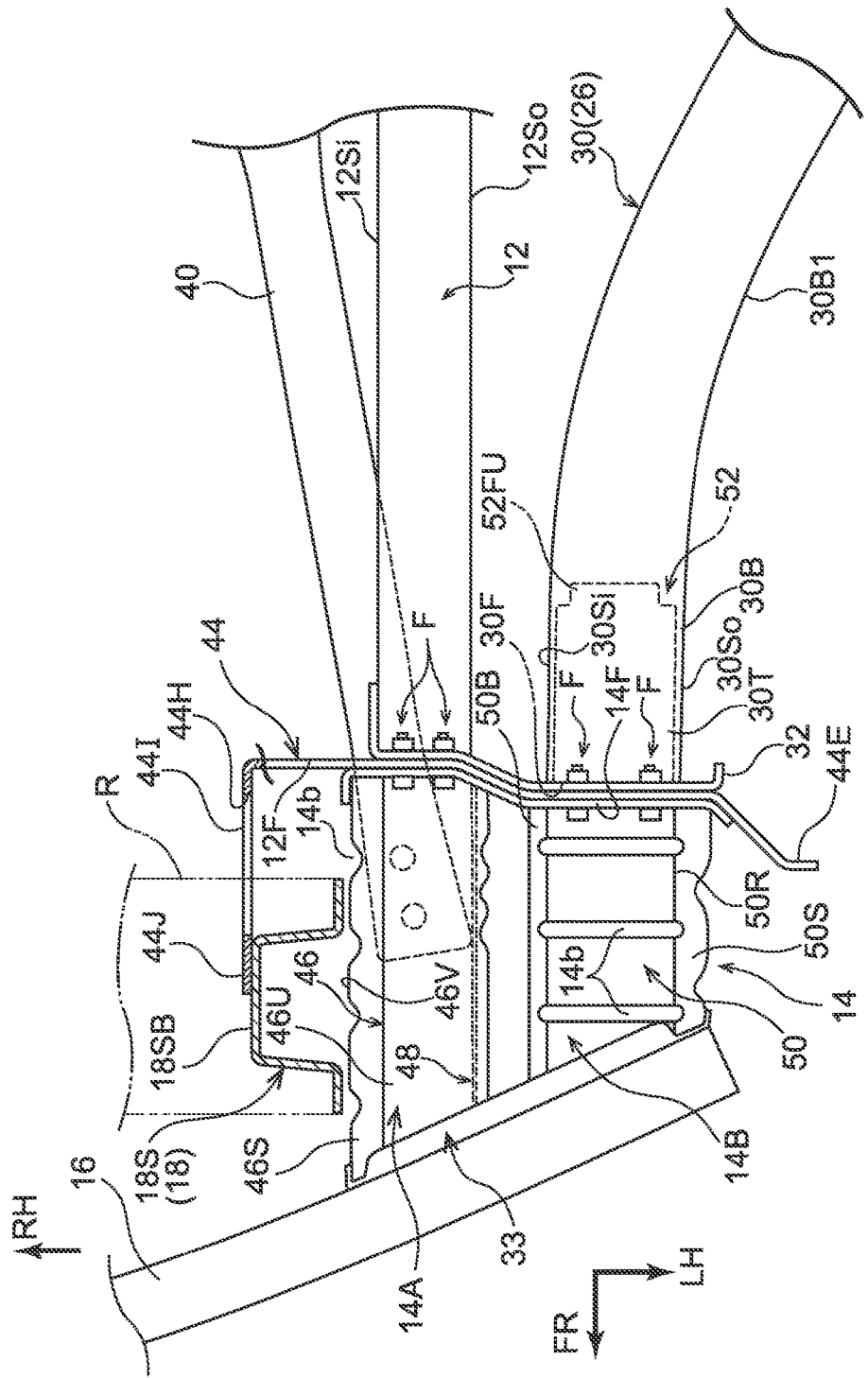
FIG. 3 is an enlarged plan view illustrating relevant portions of a vehicle body front section structure according to an exemplary embodiment of the present invention.

As illustrated in FIG. 1 and FIG. 2, the apron upper member 26 configuring the vehicle body front section structure 10 includes an outer extension 30 serving as a third support section and an outer side frame member. The outer extension 30 has a closed cross-section structure that is contiguous to a main body section (rear section) of the apron upper member 26, and, as illustrated in FIG. 3, is formed such that a front end 30F lines up at the vehicle width direction outer side of a front end 12F of the front side member 12.

Specifically, a section of the apron upper member 26 that is mainly joined to an upper end of the fender apron 22 configures a main body section 26M, and a section of the apron upper member 26 that extends further to the front than the main body section 26M configures the outer extension 30. The outer extension 30 is oriented downward and toward the vehicle width direction inner side from the main body section 26M, and forms a shape (a substantial S-shape) including two curved portions such that the front end 30F is oriented toward the front. More specifically, a curved portion 30B1 at the main body section 26M side of the outer extension 30 has a curved shape forming a bulge toward the upper front, and a curved portion 30B2 at a front end side of the outer extension 30 has a curved shape forming a bulge toward the lower rear.

Figure 6A:
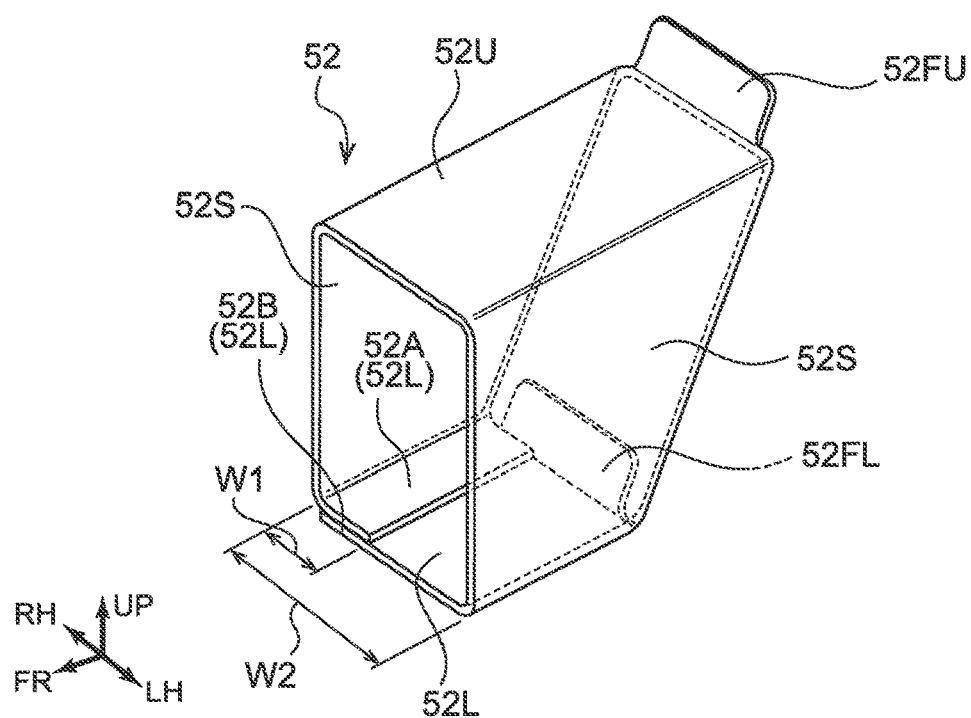
FIG. 6A is a perspective view illustrating a reinforcing member configuring a vehicle body front section structure according to an exemplary embodiment of the present invention.
Figure 6B:
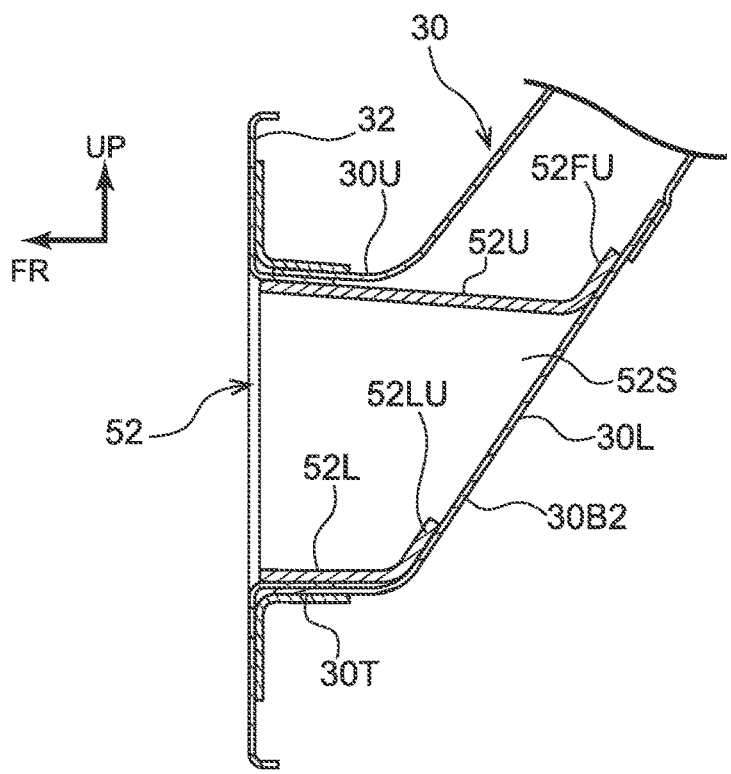
FIG. 6B is a side cross-section view illustrating an attachment state of a reinforcing member configuring a vehicle body front section structure according to an exemplary embodiment of the present invention to an outer extension.

As illustrated in FIG. 4 and FIG. 6B, a portion of the outer extension 30 further to the front side than the curved portion 30B2 configures a short tube portion 30T formed in a short rectangular tube shape extending toward the front and rear. The outer extension 30 configures a section in which the curved portion 30B2 and the short tube portion 30T are mainly disposed overlapping with the front side member 12 in side view.

As illustrated in FIG. 1, a cross-section profile of the outer extension 30 configures a substantially rectangular frame shaped cross-section profile in front cross-section view. More specifically, both vehicle width direction ends of a top wall 30U and a bottom wall 30L that face each other at the top and bottom are coupled together by side walls 30So, 30Si at the vehicle width direction inner side and outer side to configure a rectangular frame shaped cross-section profile.

The front end 30F of the outer extension 30 is substantially aligned with a front-rear direction position of the front end 12F of the front side member 12, and is disposed overlapping with the front end 12F in the up-down direction. A front portion of the outer extension 30 (the short tube portion 30T and the curved portion 30B2, described later) and the front portion of the front side member 12 are separated from each other along the vehicle width direction so as to be substantially parallel with a specific interval therebetween.

A common flange 32 is joined to the front end 30F of the outer extension 30 and the front end 12F of the front side member 12. In other words, the front end 30F of the outer extension 30 and the front end 12F of the front side member 12 are coupled together by the flange 32. In the present exemplary embodiment, the front end 30F of the outer extension 30 is positioned slightly toward the front side of the front end 12F of the front side member 12. As illustrated in FIG. 3, a step is thereby formed at flanges 32, 14F, and a main body portion 44M of the coupling plate 44, described later. Illustration of this step is omitted in the drawings other than FIG. 3.

Widened Portion of Crash Box

As illustrated in FIG. 1 and FIG. 3, in the vehicle body front section structure 10, the crash box 14 serving as a shock absorbing member has a widened structure with width that juts out further toward the vehicle width direction outer side than the front side member 12. Specifically, the crash box 14 is configured including an inner box 14A serving as a first shock absorbing section positioned at the front of the front side member 12, and an outer box 14B serving as a third shock absorbing section positioned at the front of the outer extension 30. The cross-section profile of the crash box 14 is explained below.

The inner box 14A and the outer box 14B are configured with similar energy absorption characteristics (load generation characteristics (energy absorption amount) with respect to energy absorption stroke). As illustrated in the example in FIG. 3, beads 14b for promoting deformation are formed as appropriate to the crash box 14. Note that illustration of the beads 14b is omitted in the drawings other than FIG. 3.

The flange 14F is provided by being joined to a rear end of the crash box 14. The flange 14F is fastened to the flange 32 by a fastening structure F including nuts and bolts, in a state in which the coupling plate 44, described later, is sandwiched between the flange 14F and the flange 32. The crash box 14 is thereby fixed to the respective front ends of the front side member 12 and the outer extension 30 of the apron upper member 26.

As illustrated in FIG. 3, the front end of the crash box 14 is closed off by an end plate 33. Although not illustrated in the drawings, each crash box 14 is fixed to a back face side of the bumper reinforcement 16 by screwing bolts from the bumper reinforcement 16 side onto weld nuts provided at the end plate 33. In the present exemplary embodiment, the crash box 14 corresponds to a linking member that links between the front end of the front side member 12 and the front end of the outer extension 30.

Lower Crash Box

As illustrated in FIG. 1 and FIG. 4, in the vehicle body front section structure 10, a lower crash box 34 (also referred to as a turning) serving as a second shock absorbing section is disposed below the crash box 14. The lower crash box 34 is configured with a flange 34F jutting out from a rear end of a main body portion 34M formed in a circular tube shape or a tapered tube shape with its axial direction along the front-rear direction. A lower bumper reinforcement 36 spans between front ends of the left and right lower crash boxes 34. In the present exemplary embodiment, a bracket, not illustrated in the drawings, is interposed between each lower crash box 34 and the lower bumper reinforcement 36.

A rear end of the lower crash box 34 is fastened to a front end of a lower side member 40, serving as a second support section, through a bracket 38. Note that the second support section of the present invention may be understood to be configured by the lower side member 40 and the bracket 38. The lower side member 40 has a rear end fastened to the suspension member 24 through a bracket 42, and configures a frame member with length from front to rear. In the present exemplary embodiment, as illustrated in FIG. 3, the lower side member 40 slopes with respect to the front-rear direction in plan view, such that the front end is positioned further to the vehicle width direction outer side than the rear end thereof. This slope angle is set at approximately 15°, for example, in consideration of a relative angle to a counterpart vehicle in the event of an oblique collision, described later.

The bracket 38 includes an upright wall 38V fastened together with the flange 34F by a fastening structure F together with the coupling plate 44, described below, and a horizontal wall 38H extending from a lower end of the upright wall 38V toward the front, and is formed in a substantially L-shape in side view. The front end of the lower side member 40 is fastened and fixed to the horizontal wall 38H from the lower side by a fastening structure F.

Coupling Plate

As illustrated in FIG. 1, FIG. 3, and FIG. 4, the vehicle body front section structure 10 includes the coupling plate 44 serving as a coupling member that couples together the crash box 14 side of the front side member 12 and the lower crash box 34 side of the lower side member 40. In the present exemplary embodiment, the coupling plate 44 couples together the front side member 12 and the lower side member 40 at the main body portion 44M forming a flat plate shape facing the front-rear direction (excluding the above-mentioned step illustrated in FIG. 3).

Specifically, an upper portion of the main body portion 44M is fastened together with the flanges 14F, 32 by the fastening structure F in a state sandwiched between the flange 14F of the crash box 14 and the flange 32 at the front side member 12 side. A lower portion of the main body portion 44M is fastened together with the flange 34F of the lower crash box 34 from a back face side of the upright wall 38V of the bracket 38 by the fastening structure F. Namely, the main body portion 44M is fixed to the front side member 12, the outer extension 30, and the lower side member 40 by fastening, together with the upper and lower crash boxes 14, 34.

The coupling plate 44 thereby couples together the inner box 14A side (a front end portion) of the front side member 12 and the lower crash box 34 side (a front end portion) of the lower side member 40. The coupling plate 44 also couples a front end portion at the outer box 14B side of the outer extension 30 together with the respective front end portions of the front side member 12 and the lower side member 40.

An outer wall 44E extends toward the front from a vehicle width direction outer edge portion of the main body portion 44M of the coupling plate 44. An inner wall 44I, serving as a retaining portion forming a flat plate shape facing the vehicle width direction with length from top to bottom, extends toward the front from a vehicle width direction inner edge portion of the main body portion 44M of the coupling plate 44. The radiator support side 18S is joined to the inner wall 44I. Specific explanation follows.

First, to explain further regarding the radiator support side 18S, as illustrated in FIG. 3, the radiator support side 18S is formed with a hat shaped cross-section open toward the vehicle width direction outer side. The inner wall 44I of the coupling plate 44 is joined to a bottom wall 18SB forming the bottom of the hat shape at a vehicle width direction inner end of the radiator support side 18S. More specifically, a front end portion of the inner wall 44I of the coupling plate 44 is joined to a rear portion of the bottom wall 18SB. The coupling plate 44 thereby retains the radiator unit R through the radiator support 18.

As illustrated in FIG. 4, a hole portion 44H, serving as a weakened portion, is formed in the inner wall 44I of the coupling plate 44. The hole portion 44H pierces through the thickness direction of the inner wall 44I (the vehicle width direction), and configures an elongated hole that is configured lengthwise along the up-down direction. In the present exemplary embodiment, as illustrated in FIG. 3, a portion of the inner wall 44I positioned at the front side of the hole portion 44H configures a joint region 44J to the bottom wall 18SB of the radiator support side 18S. Note that FIG. 3 illustrates a portion of the coupling plate 44 including the inner wall 44I and the radiator support side 18S in cross-section.

In the above explanation, the coupling plate 44 has been explained as a separate structure to the radiator support side 18S; however, the coupling plate 44 may be considered as a member configuring the radiator support side 18S, namely, the radiator support 18.

Relationship between Crash Box in Cross-section Profile and Outer Extension

As illustrated in FIG. 5, a shock absorbing section of the crash box 14 is formed as a closed cross-section structure by joining an inner panel 46, an outer panel 48, and an expansion panel 50. Specifically, the inner panel 46 forms a substantially U-shape open toward the vehicle width direction outer side, and upper and lower walls 46U, 46L at the open end side are joined to upper and lower ends of the outer panel 48. The inner box 14A is thereby formed as a closed cross-section structure at the vehicle width direction inner side.

The inner panel 46 configuring the inner box 14A includes a pair of upper and lower sloped walls 46S formed between an upright wall 46V at the vehicle width direction inner side, and the upper and lower walls 46U, 46L. A pair of upper and lower ridge lines (bent portions) 46R, forming vehicle width direction outer edges of the upper and lower sloped walls 46S, are thereby formed between the upright wall 46V and the outer panel 48 of the inner box 14A.

The expansion panel 50 forms a substantially U-shape open toward the vehicle width direction inner side, and upper and lower walls 50U, 50L at the open end side are joined to the upper and lower walls 46U, 46L of the inner panel 46. The outer box 14B is thereby formed as a closed cross-section structure at the vehicle width direction outer side.

The upper wall 50U and lower wall 50L of the expansion panel 50 configuring the outer box 14B includes a pair of upper and lower sloped walls 50S formed between an upright wall 50V at the vehicle width direction outer side, and the upper and lower walls 50U, 50L. A pair of upper and lower ridge lines (bent portions) 50R, forming vehicle width direction inner edges of the upper and lower sloped walls 50S, are thereby formed between the upright wall 50V and the outer panel 48 of the outer box 14B. Step portions 50B are formed at the upper wall 50U and lower wall 50L of the expansion panel 50 between the outer panel 48 and the ridge lines 50R, such that the portion at the outer side in the vehicle width direction becomes more narrow in the up-down direction than the portion at the inner side.

As illustrated in FIG. 3, the upright wall 46V and the sloped walls 46S of the inner box 14A of the crash box 14 are substantially aligned with the vehicle width direction position of a side wall 12Si at the vehicle width direction inner side of the front side member 12. The outer panel 48 of the inner box 14A is substantially aligned with the vehicle width direction position of a side wall 12So at the vehicle width direction outer side of the front side member 12.

As illustrated in FIG. 5, the sloped walls 50S of the outer box 14B are substantially aligned with the vehicle width direction position of the side wall 30So at the vehicle width direction outer side of the outer extension 30. The upper and lower step portions 50B of the outer box 14B are substantially aligned with the vehicle width direction position of the side wall 30Si at the vehicle width direction inner side of the outer extension 30.

In the present exemplary embodiment, the upper side stepped portion 50B is disposed intersecting the side wall 30Si of the outer extension 30 (including the portion with the aligned vehicle width direction position) in front view. The lower side stepped portion 50B is disposed slightly misaligned at the vehicle width direction outer side of the side wall 30Si of the outer extension 30 in front view. In the present exemplary embodiment, the bottom wall 30L of the outer extension 30 is disposed cutting across the lower side stepped portion 50B in extremely close vicinity to the side wall 30Si. Note that it goes without saying that the lower side stepped portion 50B may be disposed intersecting the side wall 30Si of the outer extension 30 in front view.

Reinforcing Structure of Apron Extension Section

As illustrated in FIG. 1, FIG. 3, and FIG. 4, a reinforcing member 52, configuring a reinforcing structure of the present invention, is provided to a portion of the outer extension 30, serving as an apron extension section, overlapping with the front side member 12 in side view (along the up-down direction). Specifically, as illustrated in FIG. 6B, the reinforcing member 52 is mainly provided inside the curved portion 30B2 and the short tube portion 30T at the front side of the outer extension 30. In the present exemplary embodiment, the outer extension 30 with a closed cross-section structure is configured reinforced from the inside by the reinforcing member 52 with a closed cross-section structure. Specific explanation follows.

The reinforcing member 52 forms a substantially rectangular frame shaped cross-section profile running along an inner face of the short tube portion 30T in front view. Specifically, the reinforcing member 52 is configured with a rectangular frame shaped cross-section profile, in which both vehicle width direction ends of a top wall 52U and a bottom wall 52L facing each other at the top and bottom are coupled together by a pair of side walls 52S.

As illustrated in FIG. 6B, the top wall 52U forms a flat plate shape extending along the front-rear direction from a front end of the short tube portion 30T of the outer extension 30 until hitting a portion of the bottom wall 30L configuring the curved portion 30B2. A front end portion of the top wall 52U is joined to the top wall 30U configuring the short tube portion 30T. An upper flange 52FU extending diagonally toward the upper rear extends from a rear end of the top wall 52U, and the upper flange 52FU is joined to the bottom wall 30L configuring the curved portion 30B2.

The bottom wall 52L forms a flat plate shape extending along the front-rear direction from the front end of the short tube portion 30T until hitting a portion of the bottom wall 30L configuring the curved portion 30B2. A front end portion of the bottom wall 52L is joined to the bottom wall 30L configuring the short tube portion 30T. A lower flange 52FL extending diagonally toward the upper rear extends from a rear end of the bottom wall 52L, and the lower flange 52FL is joined to the bottom wall 30L configuring the curved portion 30B2.

The pair of left and right side walls 52S are each formed in a trapezoidal shape with an upper end side as the long end in side view, and extend from front ends of the top wall 52U and the bottom wall 52L, namely, the front end of the short tube portion 30T, until hitting a portion of the bottom wall 30L configuring the curved portion 30B2. Each side wall 52S is joined to the side wall out of the pair of side walls 30So, 30Si that is positioned on the same left or right side.

The reinforcing member 52 is thereby joined from the inside to the top wall 30U, the bottom wall 30L, and the side walls 30So, 30Si configuring the short tube portion 30T and the curved portion 30B2 of the outer extension 30. A portion of the outer extension 30 positioned overlapping with the front side member 12 in side view is thereby reinforced from the inside by the reinforcing member 52 as described above (see FIG. 4).

The reinforcing member 52 configures a wrapped-around structure with a closed cross-section profile by bending (pressing) and joining a plate member. Specifically, as illustrated in FIG. 6A, the top wall 52U, the bottom wall 52L, the left and right side walls 52S, and the upper and lower flanges 52FU, 52FL are formed by bending a flat plate.

In the present exemplary embodiment, a portion configuring the bottom wall 52L is configured by a base end portion 52A and a terminal end portion 52B of the flat plate, this being a base material, joined together in a state so as to be superimposed in the thickness direction. A portion of the bottom wall 52L including the base end portion 52A has a width W1 (joint width) occupying a portion inside the short tube portion 30T at the vehicle width direction inner side. A portion of the bottom wall 52L including the terminal end portion 52B has a width W2 across substantially the total width inside the short tube portion 30T between the pair of side walls 30So, 30Si. The top wall 52U and the bottom wall 52L of the reinforcing member 52 are thereby each configured including a portion formed of a single plate extending from the side wall 52S at the vehicle width direction outer side to the side wall 52S at the inner side (a portion equivalent to a lateral wall portion). Note that, by configuring the terminal end portion 52B so as to be positioned within the range of the plate thickness of the side wall 52S at the vehicle width direction inner side, the lateral wall portion including the whole terminal end portion 52B may be considered to have the width W2 across substantially the entire width of the reinforcing member 52.

Operation

Explanation follows regarding operation of the present exemplary embodiment.

Explanation follows below regarding operation in a case in which a collision has occurred in a mode in which a colliding body has collided mainly with the left side, this being one vehicle width direction side, of the automobile A applied with the vehicle body front section structure 10 with the above configuration. Examples of collisions in such a mode include a small overlap collision and an oblique collision (oblique crash).

Note that a small overlap collision is a frontal collision of the automobile A in which an overlap amount in the vehicle width direction with a collision counterpart such as that specified by IIHS is 25% or less. For example, a collision at the vehicle width direction outer side of a front side member, this being a vehicle body frame, equates to a small overlap collision. In the present exemplary embodiment, as an example, a small overlap collision at a relative speed of 64 km/hr is envisaged. An oblique collision is an oblique frontal collision specified by NHTSA, for example (such as a collision with a relative angle of 15° and an overlap amount in the vehicle width direction of approximately 35% with respect to a collision counterpart). In the present exemplary embodiment, as an example, an oblique collision at a relative speed of 90 km/hr is envisaged.

When a collision has occurred in such a mode, load from a colliding body (a barrier Br illustrated in FIG. 7) is input to vehicle width direction end portions of the bumper reinforcement 16 and the lower bumper reinforcement 36. When this occurs, energy is absorbed at an initial stage of the collision, while the crash box 14 and the lower crash box 34 undergo compression failure.

Figure 7A:
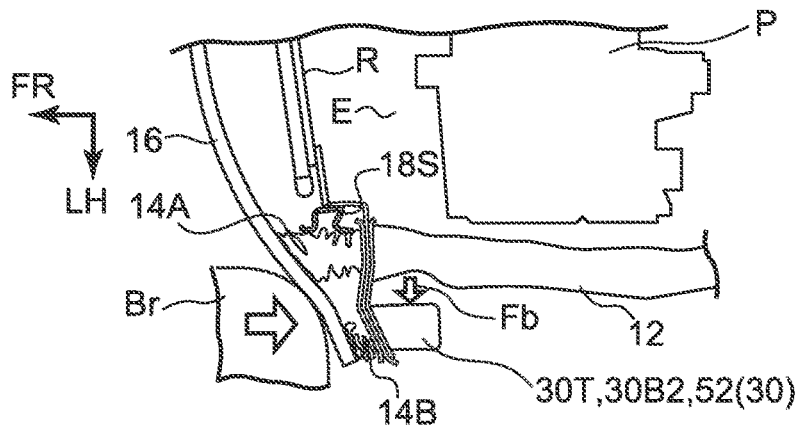
FIG. 7A is a plan view schematically illustrating an operation at a specific point in time during a small overlap or an oblique collision with respect to a vehicle body front section structure according to an exemplary embodiment of the present invention.
Figure 7B:
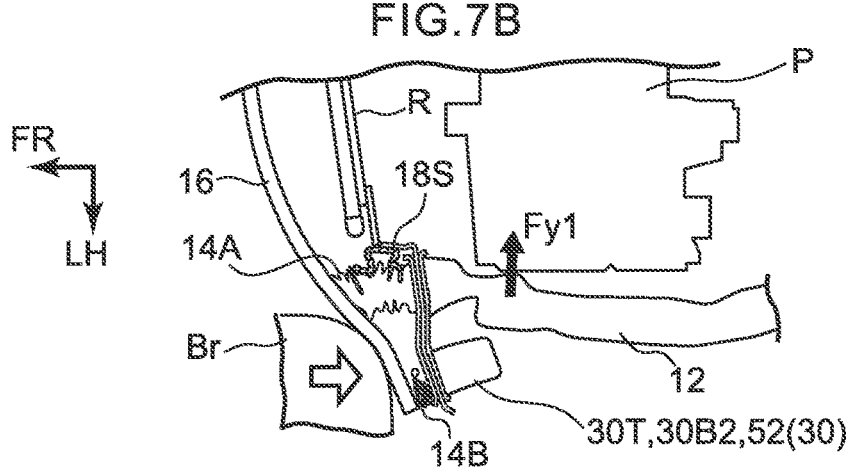
FIG. 7B is a plan view schematically illustrating an operation at a specific point in time after that illustrated in FIG. 7A during a small overlap or an oblique collision with respect to a vehicle body front section structure according to an exemplary embodiment of the present invention.

Collision load is input to the bumper reinforcement 16 at the vehicle width direction outer side of the front side member 12, such that, as illustrated in FIG. 7A, a bending load Fb acts on the front side member 12, pulling the front end thereof toward the vehicle width direction outer side. As illustrated in FIG. 7B, a fold toward the vehicle width direction inner side occurs in the front side member 12 under the load Fb.

When this occurs, the fold portion of the front side member 12 impinges on the power unit P, and part of the collision load from the barrier Br is input as lateral force Fy1 (inertia force) toward the collision opposite side in the vehicle width direction to the power unit P, namely, (one of) a mass concentration portion of the front section of the automobile A. The lateral force Fy1 contributes to promoting the vehicle body of the automobile A to move away from and pass by the barrier Br.

Figure 7C:
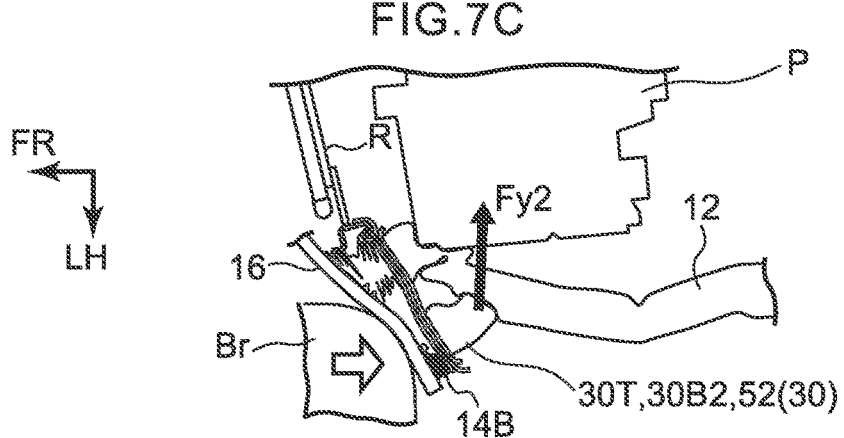
FIG. 7C is a plan view schematically illustrating an operation at a specific point in time after that illustrated in FIG. 7B during a small overlap or an oblique collision with respect to a vehicle body front section structure according to an exemplary embodiment of the present invention.

As illustrated in FIG. 7C, when the collision progresses further, a fold occurs in the bumper reinforcement 16. The front end portion of the outer extension 30 of the apron upper member 26 bends toward the front side member 12 side when this occurs. The front portion of the outer extension 30 (the short tube portion 30T and the curved portion 30B2) disposed overlapping with the front side member 12 in side view accordingly impinges on the side wall 12So of the front side member 12.

As illustrated in FIG. 7C, part of the load from the barrier Br is thereby efficiently transmitted to the power unit P as lateral force Fy2 through the outer extension 30 and the front side member 12. The vehicle body is thereby further promoted to pass by the barrier Br by the vehicle body of the automobile A moving away from the barrier Br.

As explained above, deformation of the vehicle body of the automobile A is suppressed by distribution of load to the upper and lower bumper reinforcements 16, 36, absorption of energy in the initial stage of the collision, and the generation of lateral force toward the power unit P.

Operation and Advantageous Effects of Widened Crash Box

In the vehicle body front section structure 10, the crash box 14 is configured including the inner box 14A positioned at the front of the front side member 12, and the outer box 14B positioned at the front of the outer extension 30. In other words, the crash box 14 is widened so as to link (straddle) between the front side member 12 and the outer extension 30.

Thus in the event of a small overlap collision or an oblique collision, folding of the vehicle width direction end portion of the bumper reinforcement 16 (at the outer side of the front side member 12) is suppressed, and energy is efficiently absorbed by the crash box 14. Moreover, the phenomenon in which the collision counterpart slips past the vehicle width direction outer side of the front side member 12 without energy being absorbed by the crash box 14 is prevented or effectively suppressed.

The outer box 14B is connected to the outer extension 30. Thus a load transmission path is formed from the outer box 14B to the main body section 26M of the apron upper member 26 through the outer extension 30, in addition to a load transmission path from the inner box 14A to the front side member 12. Namely, load input to the vehicle width direction end portion of the bumper reinforcement 16 is efficiently distributed to each vehicle body section.

The sloped walls 50S at the vehicle width direction outer side of the outer box 14B are substantially aligned with the vehicle width direction position of the side wall 30So of the outer extension 30. The step portions 50B at the vehicle width direction inner side are substantially aligned with the vehicle width direction position of the side wall 30Si of the outer extension 30. The widened range is thereby effectively utilized to absorb energy, compared to a Comparative Example in which the step portions 50B are not included, or a Comparative Example in which the step portions 50B are not aligned with the side wall 30Si in the vehicle width direction, in a crash box 14 with a flattened shape widened along the vehicle width direction.

To explain further, an effective region for load burden is increased by forming the step portions 50B to the outer box 14B of the crash box 14, in other words, by adding ridge lines that are fold portions of a plate member. Namely, the energy absorption amount (load generated per stroke) by the outer box 14B of the crash box 14 thereby increases. The side lengths of the upper and lower walls 50U, 50L of the expansion panel 50 are shorter than in a configuration in which the step portions 50B are not formed, such that the buckling wavelength is shorter and energy absorption is more efficient.

Since the vehicle width direction positions of the step portions 50B and the side wall 30Si of the outer extension 30 are substantially aligned as described above, load input to the outer box 14B can be directly transmitted to the outer extension 30. Load transmission efficiency from the bumper reinforcement 16 to the front side member 12 and the outer extension 30 through the crash box 14 is accordingly improved.

Operation and Advantageous Effects of Coupling Plate

In the vehicle body front section structure 10, the front end portion of the front side member 12 at the inner box 14A side, and the front end portion of the lower side member 40 at the lower crash box 34 side are coupled together by the coupling plate 44. A path along which load from the crash box 14 is transmitted to the lower side member 40 through the coupling plate 44, and a path along which load from the lower crash box 34 is transmitted to the front side member 12 through the coupling plate 44, are thereby formed.

This enables load input to the upper and lower crash boxes 14, 34 (the respective bumper reinforcements 16, 36) to be distributed to each frame section of the vehicle body during a process of energy absorption by the upper and lower crash boxes 14, 34 (the initial stage of the collision). Namely, load can be efficiently distributed to each vehicle body section, even when load is unevenly input to the upper and lower crash boxes 14, 36.

Thus, in the vehicle body front section structure 10 according to the present exemplary embodiment, load in a small overlap collision or an oblique collision can be distributed to each vehicle body section during the initial stage of the collision. This enables load to be suppressed from concentrating at a specific frame member, and deformation at the vehicle cabin side of the vehicle body to be suppressed to a small amount in a small overlap collision or an oblique collision, compared to a configuration that does not include the coupling plate 44.

The front end portion of the outer extension 30 at the outer box 14B side, and the respective front end portions of the front side member 12 and the lower side member 40, are coupled together by the coupling plate 44. A path along which load from the inner box 14A is transmitted to the outer extension 30 through the coupling plate 44, and a path along which load from the outer box 14B is transmitted to the front side member 12 through the coupling plate 44, are thereby formed. Similarly, a path along which load from the lower crash box 34 is transmitted to the outer extension 30 through the coupling plate 44, and a path along which load from the outer box 14B is transmitted to the lower side member 40 through the coupling plate 44, are thereby formed.

This enables load input to the crash box 14 and the lower crash box 34 to be distributed to each frame section of the vehicle body during the energy absorption process by the crash box 14. In particular, since the outer box 14B is supported by the outer extension 30, load can be efficiently distributed over a wider range of the vehicle body than in a configuration in which, for example, the outer box 14B is supported by a widened portion, a branched portion, or the like of the front side member 12.

In the vehicle body front section structure 10, the radiator support side 18S is joined (retained) at the front side portion of the hole portion 44H in the inner wall 44I of the coupling plate 44. When the radiator unit R bears load toward the rear during a frontal collision or the like, the radiator unit R thereby retreats due to the inner wall 44I mainly deforming at the top and bottom of the hole portion 44H, this being the weakened portion. Damage borne by the radiator unit R in a collision at low speed (a light collision) is thereby reduced, and the likelihood that the radiator unit R needs to be replaced is reduced. The time and cost for repair (procurement of components) following a light collision is suppressed when the radiator unit R does not need to be replaced.

The crash box 14 and the lower crash box 34 are joined to the front side member 12, the outer extension 30, and the lower side member 40 by the fastening structures F. Thus, when the upper and lower bumper reinforcements 16, 36 or the upper and lower crash boxes 14, 34 have been damaged during a light collision, portions at the front side of the front side member 12, the outer extension 30 and the lower side member 40 can be replaced. This also suppresses the time and cost for repair (procurement of components) following a light collision. In the present exemplary embodiment, the front and rear ends of the lower side member 40 are respectively connected to the bracket 38 and the suspension member 24 by fastening, thereby facilitating replacement of the lower side member 40.

Operation and Advantageous Effects of Reinforcing Member

As explained above, lateral force Fy1 is input to the power unit P from the front side member 12 that has folded inward as illustrated in FIG. 7B during a small overlap collision or an oblique collision. Furthermore, lateral force Fy2 is input to the power unit P through the front side member 12 from the outer extension 30 that has impinged on the front side member 12 as illustrated in FIG. 7C.

In the vehicle body front section structure 10, the reinforcing member 52 is provided to the short tube portion 30T and the front side curved portion 30B2, these being the front end portion of the outer extension 30 that overlaps the front side member 12 in side view. The front end portion of the outer extension 30 is thereby suppressed from being crushed during a collision with the barrier Br, and rearward load from the barrier Br can be efficiently converted into lateral force Fy2 that pushes the front side member 12 toward the collision opposite side in the vehicle width direction.

The vehicle body front section structure 10 according to the present exemplary embodiment thereby enables the vehicle body to be efficiently moved toward the collision opposite side during a small overlap collision or an oblique collision.

Since the reinforcing member 52 has a closed cross-section structure, load from the barrier Br can be efficiently converted into lateral force and transmitted to the front side member 12 using a simple and lightweight structure. The reinforcing member 52 is configured as a wrapped-around structure with a closed cross-section profile by bending (pressing) and joining a plate member, thereby enabling the reinforcing member 52 with the required performance to be obtained with an even simpler structure than in a configuration in which a reinforcing member is obtained by an extruded material and a joint structure of two members.

In the reinforcing member with such a wrapped-around structure, the portion including the terminal end portion 52B that is superimposed on and joined to the base end portion 52A includes the portion formed by the single plate extending from the side wall 52S to the inner side wall 52S (across the entire width), and configures the bottom wall 52L. This enables load to be efficiently transmitted to the front side member 12 through the single plate shaped portion of the bottom wall 52L including the terminal end portion 52B, even in a situation in which the joint between the base end and the terminal end comes apart in a collision mode.

In the above exemplary embodiment, an example has been given in which the single crash box 14 includes the inner box 14A and the outer box 14B; however, the present invention is not limited thereto. For example, the inner box 14A and the outer box 14B may be configured as separate bodies. Namely, the crash box 14 is not limited to a configuration including the step portions 50B. In a configuration in which the inner box 14A and the outer box 14B are configured as separate bodies, the coupling plate 44 may be configured so as to couple at least one front end side of the front side member 12 or the outer extension 30, and the front end side of the lower side member 40. Namely, the front side member 12 and the inner box 14A may be considered to be a third support section and a third shock absorbing section, and the outer extension 30 and the outer box 14B may be considered to be a first support section and a first shock absorbing section. Furthermore, in configurations in which the coupling plate 44 couples together the front end side of the front side member 12 and the front end side of the lower side member 40, a configuration may be applied that does not include the outer box 14B.

In the above exemplary embodiment, an example has been given in which the third support section is the outer extension 30; however, the present invention is not limited thereto. For example, a configuration may be applied in which a widened portion or a branched portion provided at the front end side of the front side member 12 configures the third support section, and the outer box 14B is supported by the third support section. In configurations including the outer extension 30, the outer extension 30 is not limited to a configuration in which the rear end extends out from the apron upper member 26 connected to the front pillar. For example, a configuration may be applied including an outer extension with a rear end supported by an apron section including the fender apron 22, or a configuration may be applied in which an outer extension extends out from the apron upper member 26 with a rear end connected to a cowl section or the like. The entire apron upper member 26 including the main body section 26M and the outer extension 30 (a portion spanning from the front pillar 25 to the outer box 14B) may be considered to be an outer side frame member of the present invention.

In the above exemplary embodiment, an example has been given in which the reinforcing member 52 is provided to the outer extension 30; however, the present invention is not limited thereto. For example, a reinforcing structure may be configured by making at least a portion of the short tube portion 30T or the curved portion 30B2 of the outer extension 30 thicker. A configuration that does not include a reinforcing structure may also be applied.

In configurations including the reinforcing structure of the outer extension 30, the structure of the reinforcing member is not limited to the structure of the reinforcing member 52. For example, a configuration may be applied in which an intermediate wall is provided spanning between the pair of side walls 52S of the reinforcing member 52, or a plate shaped reinforcing member may be applied spanning between the pair of side walls 30Si, 30So of the outer extension 30. Moreover, for example, the reinforcing member with the closed cross-section structure is not limited to a closed cross-section structure formed by a wrapped-around structure of a plate member, and an aluminum extruded component or a resin molded component, for example, may be employed.

In the above exemplary embodiment, an example has been given in which the coupling plate 44 formed from a plate member is employed as a coupling member; however, the present invention is not limited thereto. A closed cross-section structure such as a pipe or a tube, for example, may be employed as the coupling member. The coupling member is not limited to a configuration fixed by fastening to the front side member 12, the outer extension 30, and the lower side member 40, and may employ a fixing structure such as welding or the like.

In the above exemplary embodiment, an example has been given in which the respective front ends of the front side member 12, the lower side member 40, and the outer extension 30, namely, three frame members, are coupled together by the coupling plate 44; however, the present invention is not limited thereto. For example, instead of the coupling plate 44, a configuration may be applied including a coupling member that couples together the front ends of any two out of the three frame members above, or a configuration may be applied that does not include a coupling member. It goes without saying that configurations including such a coupling member are not limited to a configuration in which the coupling member is a plate.

It goes without saying that various other modifications may be implemented within a range not departing from the spirit of the present invention.

The invention claimed is:

1. A vehicle body front section structure comprising:
   a front side member;
   an outer side frame member that is disposed separated from the front side member at a vehicle width direction outer side; and
   a shock absorbing member that is widened so as to straddle between the front side member and the outer side frame member, that has a cross-section orthogonal to a vehicle front-rear direction configuring a closed cross-section, that is interposed between a bumper reinforcement and respective vehicle front-rear direction front ends of the front side member and the outer side frame member, and that deforms or fails under load from a vehicle front, wherein the shock absorbing member is configured to include a first closed cross-section and a second closed-cross section, the first and second closed-cross section being lined in a vehicle width direction, wherein a portion of an upper wall and a lower wall of the second closed cross-section, which is located at an outermost side in the vehicle width direction of the first and second closed cross-sections, is aligned with the vehicle width direction position of an outer side wall of the outer side frame member, and the second closed cross-section has an upright wall that connects the upper wall and the lower wall, and the upright wall is located at an outer side in the vehicle width direction than the outer side wall of the outer side frame member.

2. The vehicle body front section structure of claim 1, wherein the first closed cross-section, which is located at an innermost side in the vehicle width direction of the first and second closed cross-sections, is aligned with the vehicle width direction position of an outer side wall of the front side member.

3. The vehicle body front section structure of claim 1, wherein the outer side frame member is configured lengthwise along the vehicle front-rear direction in plan view, and has a vehicle front-rear direction rear end connected to an apron section or a front pillar.

4. The vehicle body front section structure of claim 2, wherein the outer side frame member is configured lengthwise along the vehicle front-rear direction in plan view, and has a vehicle front-rear direction rear end connected to an apron section or a front pillar.

* * * * *